US012614550B2

(12) United States Patent
Hyun et al.

(10) Patent No.: US 12,614,550 B2
(45) Date of Patent: Apr. 28, 2026

(54) ELECTRONIC DEVICE, METHOD, AND NON-TRANSITORY COMPUTER READABLE STORAGE MEDIUM CONTROLLING EXECUTABLE OBJECT BASED ON VOICE SIGNAL

(71) Applicant: SAMSUNG ELECTRONICS CO., LTD., Suwon-si (KR)

(72) Inventors: Kyunghak Hyun, Suwon-si (KR); Kyungtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 18/538,632

(22) Filed: Dec. 13, 2023

(65) Prior Publication Data

US 2024/0135929 A1 Apr. 25, 2024
US 2024/0233723 A9 Jul. 11, 2024

Related U.S. Application Data

(63) Continuation of application No. PCT/KR2023/015549, filed on Oct. 10, 2023.

(30) Foreign Application Priority Data

Oct. 14, 2022 (KR) ........................ 10-2022-0132513
Nov. 4, 2022 (KR) ........................ 10-2022-0146561

(51) Int. Cl.

| | |
|---|---|
| *G10L 15/22* | (2006.01) |
| *G02B 27/01* | (2006.01) |
| *G06F 3/01* | (2006.01) |
| *G06F 3/04817* | (2022.01) |
| *G06F 3/0488* | (2022.01) |

(52) U.S. Cl.
CPC ............ *G10L 15/22* (2013.01); *G02B 27/017* (2013.01); *G06F 3/013* (2013.01); *G06F 3/017* (2013.01);
(Continued)

(58) Field of Classification Search
CPC .... G10L 15/22; G10L 2015/223; G06F 3/013
See application file for complete search history.

(56) References Cited

U.S. PATENT DOCUMENTS

| | | |
|---|---|---|
| 7,478,037 B2 | 1/2009 | Strong |
| 10,409,324 B2 | 9/2019 | Rhee et al. |
| (Continued) | | |

FOREIGN PATENT DOCUMENTS

| | | | |
|---|---|---|---|
| KR | 10-2016-0001465 A | 1/2016 | |
| KR | 10-2017-0120523 A | 10/2017 | |
| (Continued) | | | |

OTHER PUBLICATIONS

International Search Report and Written Opinion (PCT/ISA/210 and PCT/ISA/237) dated Jan. 25, 2024, issued by International Searching Authority for International Application No. PCT/KR2023/015549.

*Primary Examiner* — Ibrahim Siddo
(74) *Attorney, Agent, or Firm* — Sughrue Mion, PLLC

(57) ABSTRACT

An electronic device is provided. The electronic device includes a microphone. The electronic device includes a display. The electronic device includes a processor. The processor is configured to display, via the display, a screen including a plurality of executable objects. The processor is configured to enable the microphone for the executable object based on an executable object focused on among the plurality of executable objects, and display at least one visual object indicating that the microphone is enabled for receiving an input on the executable object among the plurality of executable objects, via the display. The processor is configured to identify whether a voice signal obtained via the microphone while the at least one visual object is displayed corresponds to a voice command allocated to the executable object. The processor is configured to execute a (Continued)

function of the executable object associated with the voice command, based on the voice signal corresponding to the voice command.

19 Claims, 14 Drawing Sheets

(52) U.S. Cl.
CPC ........ *G06F 3/04817* (2013.01); *G06F 3/0488* (2013.01); *G02B 2027/0178* (2013.01); *G10L 2015/223* (2013.01)

(56) References Cited

U.S. PATENT DOCUMENTS

| | | | |
|---|---|---|---|
| 10,423,225 | B2 | 9/2019 | Suk |
| 10,714,090 | B2 | 7/2020 | Liu |
| 10,962,785 | B2 | 3/2021 | Hwang et al. |
| 11,995,774 | B2 | 5/2024 | Canberk et al. |
| 2017/0061694 | A1 | 3/2017 | Giraldi et al. |
| 2017/0262051 | A1 | 9/2017 | Tall et al. |
| 2019/0056785 | A1* | 2/2019 | Suk ...................... G06F 3/04845 |
| 2019/0235833 | A1 | 8/2019 | Xie et al. |
| 2019/0339927 | A1* | 11/2019 | Gosu .................. H04N 21/4828 |
| 2021/0407203 | A1 | 12/2021 | Canberk et al. |
| 2022/0207833 | A1 | 6/2022 | Smet et al. |
| 2024/0321275 | A1 | 9/2024 | Robert et al. |

FOREIGN PATENT DOCUMENTS

| | | | |
|---|---|---|---|
| KR | 10-2017-0129165 | A | 11/2017 |
| KR | 10-2018-0071092 | A | 6/2018 |
| KR | 10-2018-0138017 | A | 12/2018 |
| KR | 10-2020-0074557 | A | 6/2020 |
| KR | 10-2022-0108163 | A | 8/2022 |

* cited by examiner

1100

ELECTRONIC DEVICE, METHOD, AND NON-TRANSITORY COMPUTER READABLE STORAGE MEDIUM CONTROLLING EXECUTABLE OBJECT BASED ON VOICE SIGNAL

CROSS-REFERENCE TO RELATED APPLICATIONS

This application is a by-pass continuation application of International Application No. PCT/KR2023/015549, filed on Oct. 10, 2023, which is based on and claims priority to Korean Patent Application No. 10-2022-0132513, filed on Oct. 14, 2022, in the Korean Intellectual Property Office and to Korean Patent Application No. 10-2022-0146561, filed on Nov. 4, 2022, in the Korean Intellectual Property Office. The disclosures of each of these applications are incorporated by reference herein in their entireties.

BACKGROUND

1. Field

The disclosure relates to an electronic device, a method, and a non-transitory computer-readable storage medium controlling an executable object based on a voice signal.

2. Description of Related Art

The electronic device may display a screen. For example, the screen may include executable objects. For example, each of the executable objects may be used to execute a function in response to a user input. For example, the user input may be a touch input with a contact point on each of the executable objects, an input received through a controller connected to the electronic device, or a gesture input identified based on an image obtained through an image sensor of the electronic device.

SUMMARY

An electronic device is provided.

The electronic device may include a microphone. The electronic device may include a display. The electronic device may include a processor. The processor may be configured to display, via the display, a screen including a plurality of executable objects. The processor may be configured to enable the microphone based on an executable object focused on among the plurality of executable objects, and display, based on the executable object, at least one visual object indicating that the microphone is enabled for receiving an input on the executable object being focused on, via the display. The processor may be configured to identify whether a voice signal obtained via the microphone while the at least one visual object is displayed corresponds to a voice command allocated to the executable object. The processor may be configured to execute a function of the executable object associated with the voice command, based on the voice signal corresponding to the voice command.

A method is provided. The method may be executed in an electronic device including a microphone and a display. The method may comprise displaying, via the display, a screen including a plurality of executable objects. The method may comprise, based on an executable object focused on among the plurality of executable objects, enabling the microphone and displaying, via the display, at least one visual object indicating that the microphone is enabled for receiving an input on the executable object being focused on. The method may comprise identifying whether a voice signal obtained via the microphone while the at least one visual object is displayed corresponds to a voice command allocated to the executable object. The method may comprise executing a function of the executable object associated with the voice command, based on the voice signal corresponding to the voice command.

A non-transitory computer-readable storage medium is provided. The non-transitory computer-readable storage medium may store one or more programs. The one or more programs may comprise instructions which, when executed by a processor of an electronic device including a microphone and a display, cause the electronic device to display, via the display, a screen including a plurality of executable objects. The one or more programs may comprise instructions which, when executed by the processor, cause the electronic device to, based on an executable object focused on among the plurality of executable objects, enable the microphone and display, via the display, at least one visual object indicating that the microphone is enabled for receiving an input on the executable object being focused on. The one or more programs may comprise instructions which, when executed by the processor, cause the electronic device to identify whether a voice signal obtained via the microphone while the at least one visual object is displayed corresponds to a voice command allocated to the executable object. The one or more programs may comprise instructions which, when executed by the processor, cause the electronic device to execute a function of the executable object associated with the voice command, based on the voice signal corresponding to the voice command.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
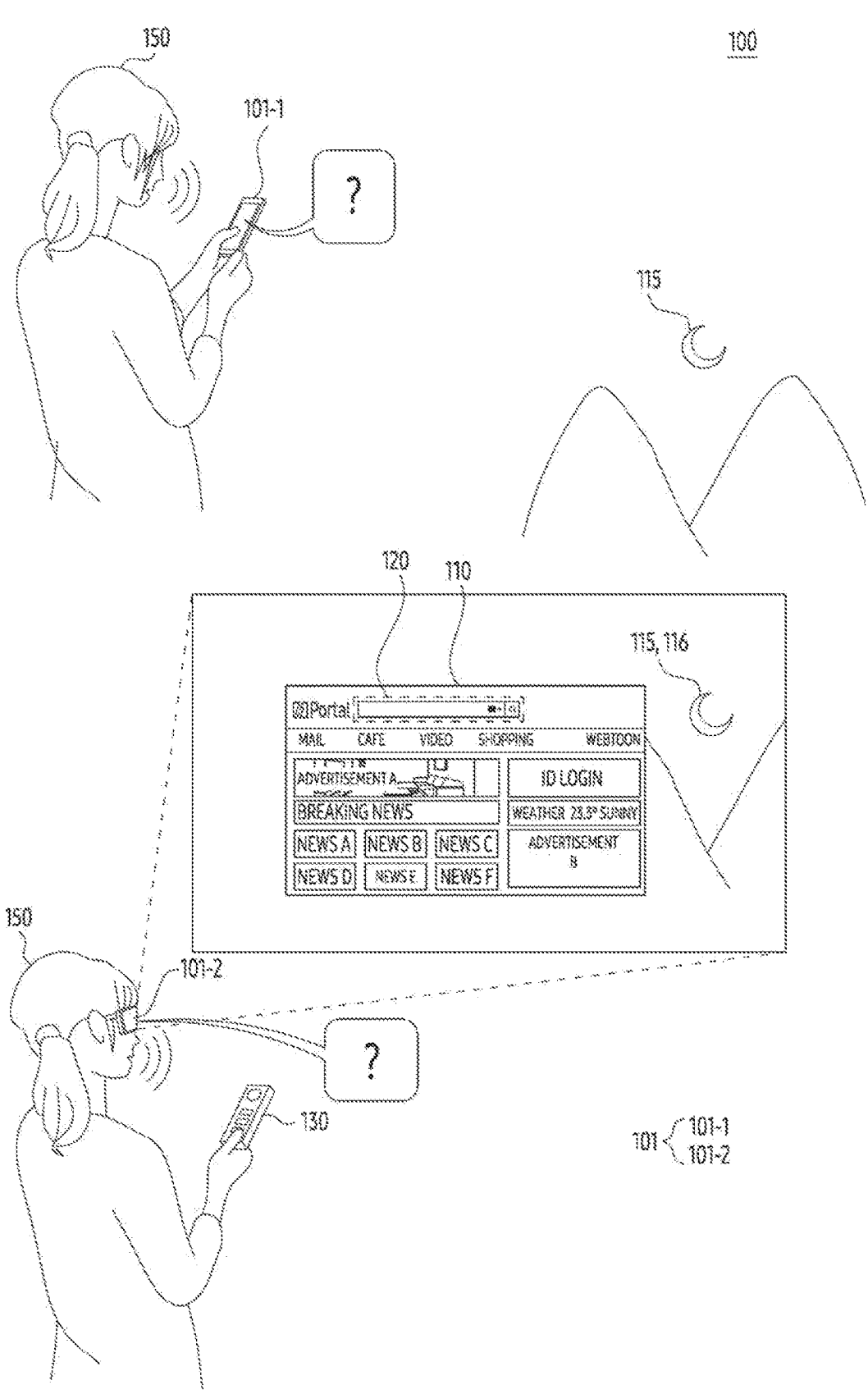
FIG. 1 illustrates an example of an environment including an exemplary electronic device.

Hereinafter, embodiments of the present disclosure will be described in detail with reference to the drawings so that those of ordinary skill in the technical field to which the present disclosure pertains may easily implement the present disclosure. However, the present disclosure may be implemented in several different forms and is not limited to the embodiments described herein. With respect to description of the drawings, the same or similar reference numerals may be used for the same or similar components. In addition, in drawings and related descriptions, descriptions of well-known functions and configurations may be omitted for clarity and brevity.

FIG. 1 illustrates an example of an environment including an exemplary electronic device.

Referring to FIG. 1, the environment 100 may include an electronic device 101.

For example, the electronic device 101 may be an electronic device 101-1 or an electronic device 101-2.

For example, the electronic device 101-1 may be a multifunction electronic device or a portable device, such as a smartphone, a tablet, or a laptop computer. For example, the electronic device 101-1 may obtain a voice signal through a microphone of the electronic device 101-1. For example, the voice signal may be caused by a user 150, to execute a function among a plurality of functions respectively executed through a plurality of voice commands defined in the electronic device 101-1. For example, the electronic device 101-1 may compare the voice signal with each of the plurality of voice commands to identify a function intended by the user 150. For example, in case that the number of the plurality of voice commands is very large or a part of the plurality of voice commands are similar to another part of the plurality of voice commands, the electronic device 101-1 may execute another function that is distinguished from the function intended by the user 150, in response to the voice signal. Since the other function is a function not intended by the user 150, execution of the other function may cause inconvenience.

For example, the electronic device 101-2 may be a wearable device worn on a part of the body of the user 150, such as an augmented reality (AR) glass, a video see-through (VST) device, or a head mount device. For example, the electronic device 101-2 may display a screen 110 through the display of the electronic device 101-2. For example, in case that the electronic device 101-2 is the AR glass, the screen 110 may be displayed with an external object 115 that is viewed through the display. For example, in case that the electronic device 101-2 is the VST device, the screen 110 may be displayed with a visual object 116 that corresponds to the external object 115 obtained through the camera of the electronic device 101-2. For example, unlike the electronic device 101-1, since the electronic device 101-2 cannot receive a touch input that is in contact with the display, the electronic device 101-2 may identify information (e.g., gesture information) received through a controller 130 connected to the electronic device 101-2 as a user input to an executable object 120 in the screen 110. For example, since the user input is not in contact with the executable object 120, executing a function of the executable object 120 through the user input may cause inconvenience. For another example, the electronic device 101-2 may obtain a voice signal through the microphone of the electronic device 101-2. For example, the voice signal may be caused by the user 150, to execute a function among a plurality of functions respectively defined in the electronic device 101-2. For example, the electronic device 101-2 may compare the voice signal with each of the plurality of voice commands to identify the function intended by the user 150. For example, in case that the number of the plurality of voice commands is very large or a part of the plurality of voice commands are similar to another part of the plurality of voice commands, the electronic device 101-2 may execute another function that is distinguished from the function intended by the user 150, in response to the voice signal. Since the other function is a function not intended by the user 150, execution of the other function may cause inconvenience.

The electronic device 101 to be illustrated below may include components for reducing such inconvenience. The components may be illustrated in FIG. 2.

Figure 2:
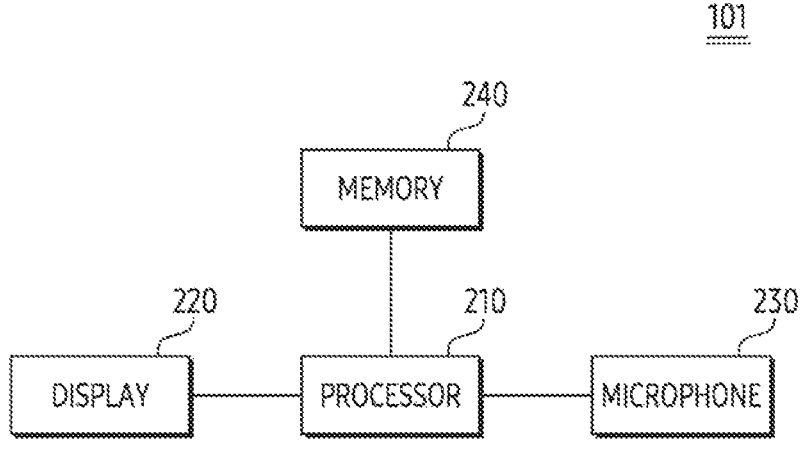
FIG. 2 is a simplified block diagram of an exemplary electronic device.

FIG. 2 is a simplified block diagram of an exemplary electronic device.

Referring to FIG. 2, the electronic device 101 may include a processor 210, a display 220, a microphone 230 and a memory 240.

Figure 11:
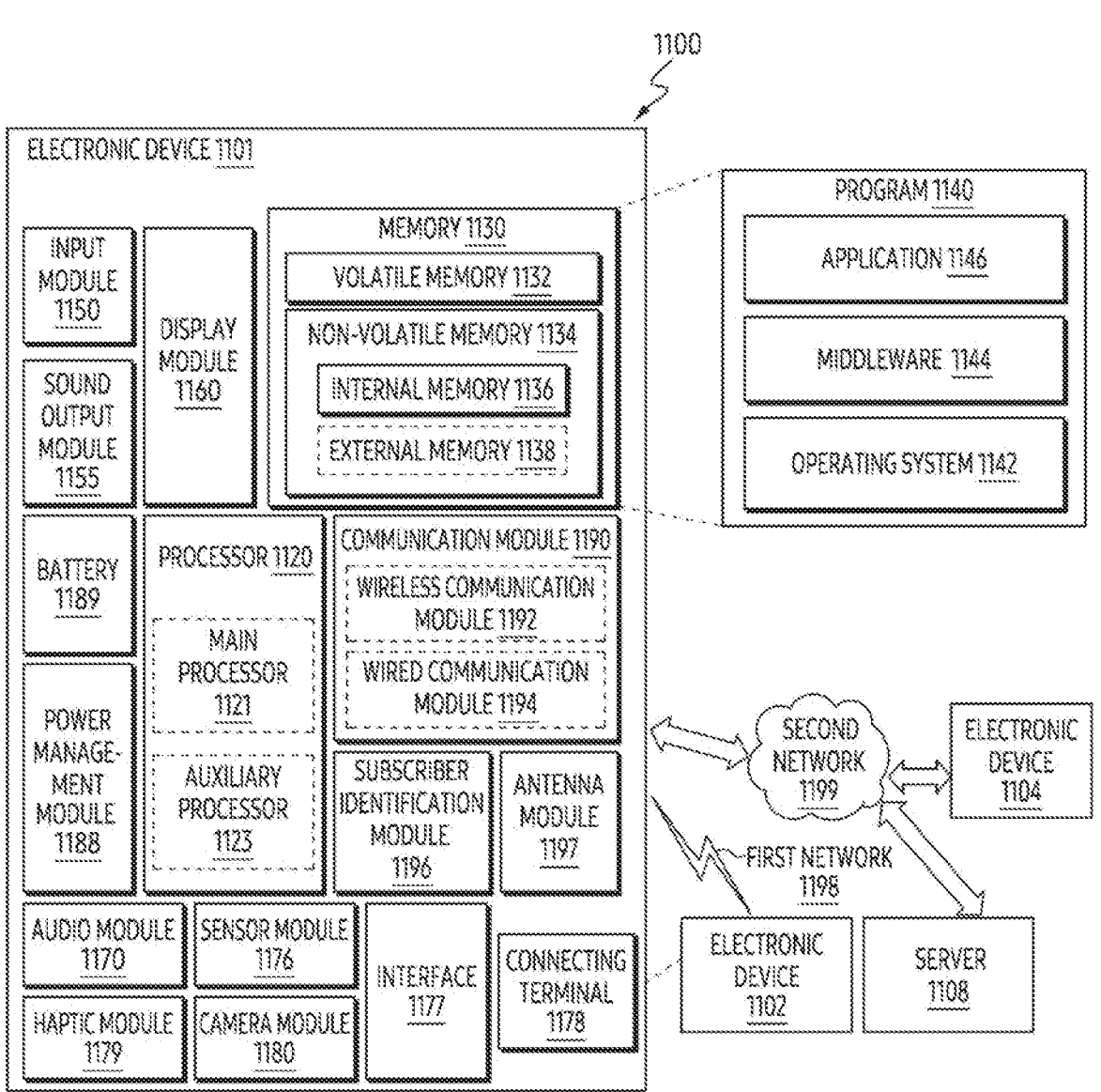
FIG. 11 is a block diagram of an electronic device in a network environment according to various embodiments.

For example, the processor 210 may include at least a part of the processor 1120 of FIG. 11. For example, the display 220 may include at least a part of the display module 1160 of FIG. 11. For example, the display 220 may include a transparent display when the electronic device 101 is an AR glass. For example, the microphone 230 may include at least a part of the input module 1150 of FIG. 11. For example, the memory 240 may include at least a part of the memory 1130 of FIG. 11.

For example, the processor 210 may be operably coupled with each of the display 220, the microphone 230 and the memory 240. For example, the fact that the processor 210 is operably coupled with each of the display 220, the microphone 230 and the memory 240 may indicate that the processor 210 is directly connected to each of the display 220, the microphone 230 and the memory 240. For example, the fact that the processor 210 is operably coupled with each of the display 220, the microphone 230 and the memory 240 may indicate that the processor 210 is connected to each of the display 220, the microphone 230 and the memory 240 through another component of the electronic device 101. For example, the fact that the processor 210 is operably coupled with each of the display 220, the microphone 230 and the memory 240 may indicate that each of the display 220, the microphone 230 and the memory 240 operates based on instructions executed by the processor 210. For example, the fact that the processor 210 is operably coupled with each of the display 220, the microphone 230 and the memory 240 may indicate that each of the display 220, the microphone 230 and the memory 240 is controlled by the processor 210. However, the disclosure is not limited thereto.

For example, the processor 210 may be configured to execute operations to be illustrated below.

Figure 3:
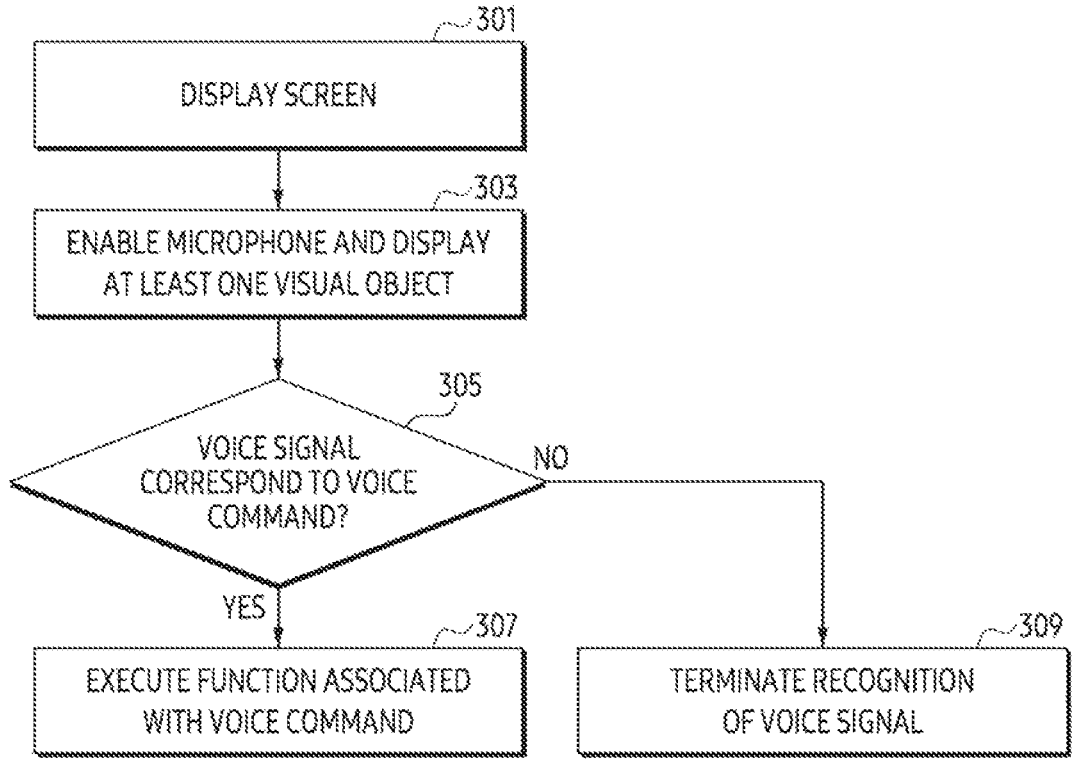
FIG. 3 is a flowchart illustrating an exemplary method of executing a function associated with a voice command allocated to an executable object based on a voice signal.

FIG. 3 is a flowchart illustrating an exemplary method of executing a function associated with a voice command allocated to an executable object based on a voice signal. The method may be executed by the processor 210 illustrated in FIG. 2. In the following embodiment, each operation may be performed sequentially, but is not necessarily performed sequentially. For example, the order of each operation may be changed, or at least two operations may be performed in parallel.

Referring to FIG. 3, in operation 301, the processor 210 may display a screen through the display 220. For example, the screen may include a plurality of executable objects. For example, the screen may be an execution screen of a software application (e.g., an application 1146 of FIG. 11). For example, the screen may be a wallpaper. For example, the screen may be a lock screen. However, the disclosure is not limited thereto. For example, each of the plurality of executable objects may be set to execute a function in response to a user input. For example, the plurality of executable objects may be used to provide functions for a software application. For example, a part of the plurality of executable objects and another part of the plurality of executable objects may be used to provide functions for different software applications. For example, the part of the plurality of executable objects may be used to provide at least one function for a first software application, and the other part of the plurality of executable objects may be used to provide at least one function for a second software application. For example, each of the plurality of executable objects may be referred to as a user interface component. For example, an attribute of a user input received to execute a corresponding function through a part of the plurality of executable objects may differ from an attribute of a user input received to execute the corresponding function through another part of the plurality of executable objects. For example, the part of the plurality of executable objects may be set to execute the corresponding function in response to a tap input, and the other part of the plurality of executable objects may be set to execute the corresponding function in response to a drag input. The plurality of executable objects will be illustrated in FIG. 4.

In operation 303, the processor 210 may enable a microphone (e.g., the microphone 230 of FIG. 2) and display at least one visual object, based on an executable object being focused on among the plurality of executable objects.

For example, the fact that the executable object is focused on, among the plurality of executable objects, may indicate that the executable object is selected (or identified) among the plurality of executable objects. For example, the fact that the executable object is focused on among the plurality of executable objects may indicate that a cursor (or a pointer) is located on the executable object among the plurality of executable objects. For example, when information for displaying the screen indicates that the cursor is located on the executable object in response to displaying the screen, the executable object may be focused on in response to displaying the screen based on the information. For example, when the cursor moved according to a user input is located on the executable object, the executable object may be focused on. For example, the user input may be a touch input, a gesture input, or a gaze input. However, the disclosure is not limited thereto. For example, the fact that the executable object is focused on among the plurality of executable objects may indicate a state of waiting to execute a function of the executable object identified (or selected) among the plurality of executable objects. For example, the fact that the executable object is focused on may be indicated by a visual object (e.g., the pointer or cursor) located on or around the executable object. For example, the visual object may be distinguished from another visual object displayed in association with a user input. However, the disclosure is not limited thereto.

For example, the microphone 230 may be enabled for the executable object focused on among the plurality of executable objects. For example, the microphone 230 may be enabled for receiving a voice input for the executable object, where the voice input is distinct from an input to the executable object through a controller (e.g., the controller 130 of FIG. 1) connected to the electronic device 101, a touch input to the executable object, a gaze input to the executable object, and a gesture input to the executable object. For example, the microphone 230 may be enabled in response to identifying that the executable object is focused on. For example, the fact that the microphone 230 is enabled for the executable object may indicate that the microphone 230 is enabled in response to focusing on the executable object. For example, the fact that the microphone 230 is enabled for the executable object may indicate that a voice signal obtained through the microphone 230 is processed to identify or recognize whether the voice signal is a voice input for the executable object. However, the disclosure is not limited thereto.

For example, the at least one visual object may indicate that the microphone 230 is enabled for receiving an input for the executable object among the plurality of executable objects.

For example, the at least one visual object may include a visual object displayed as associated with the executable object. For example, the executable object associated with the visual object may be visually highlighted for at least one other executable object among the plurality of executable objects. For example, the executable object may be visually highlighted for the at least one other executable object, through the visual object displayed along a periphery of the executable object.

For example, the at least one visual object may include another visual object distinct from the visual object. For example, the other visual object may indicate that the microphone is enabled. For example, the at least one visual object may include the visual object and/or the other visual object. For example, when the at least one visual object includes both the visual object and the other visual object, the other visual object may be spaced apart from the visual object.

Figure 4:
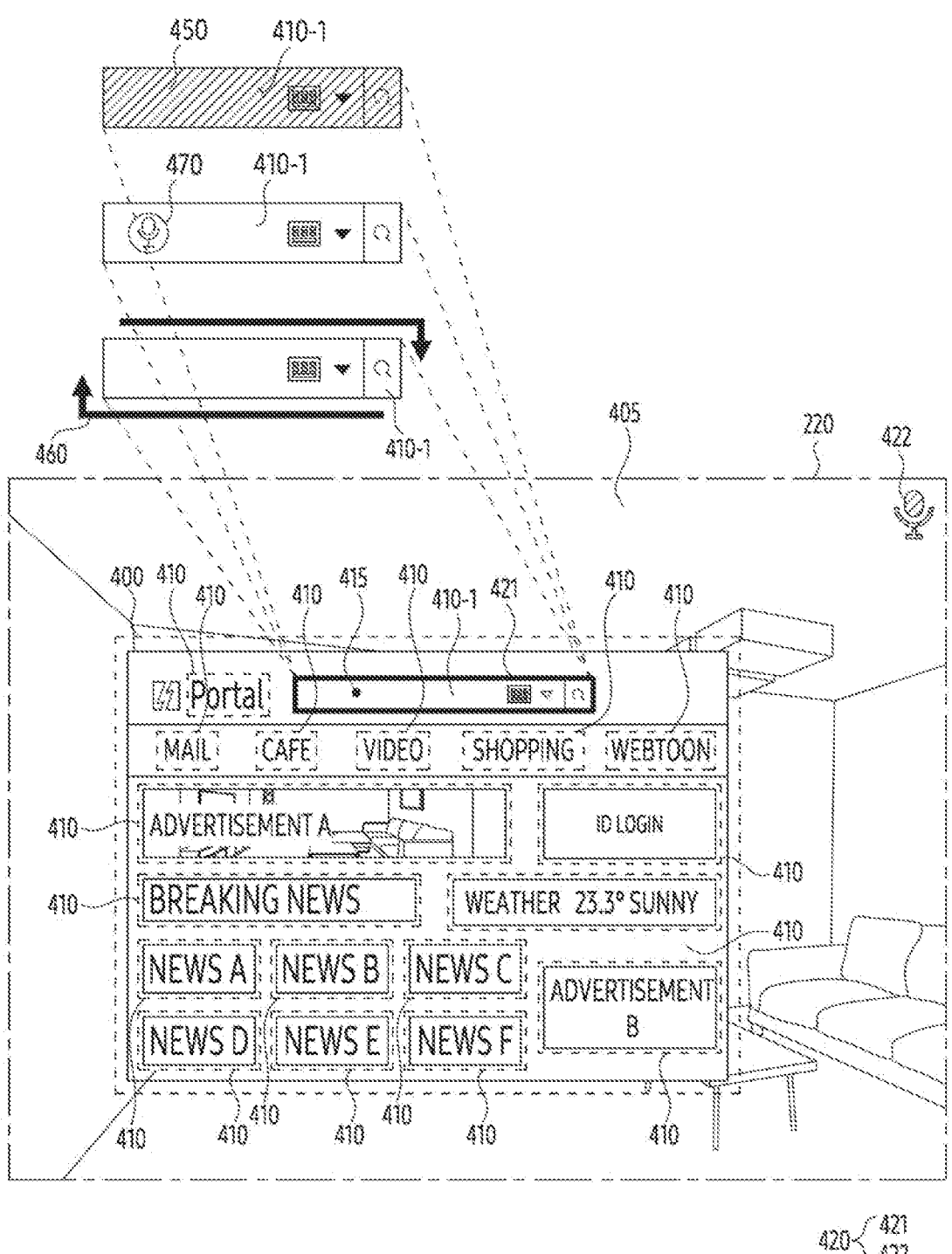
FIG. 4 illustrates an example of at least one visual object indicating that a microphone is enabled for receiving an input on an executable object.

The visual object and the other visual object may be illustrated in FIG. 4.

FIG. 4 illustrates an example of at least one visual object indicating that a microphone is enabled for receiving an input on an executable object.

Referring to FIG. 4, a processor (e.g., the processor 210 of FIG. 2) may display a screen 400. For example, the screen 400 may at least partially overlap a background 405. For example, when the electronic device 101 is an AR glass, the background 405 may be a real environment around the electronic device 101 viewed through the display 220. For example, when the electronic device 101 is a VST device, the background 405 may be an image representing the real environment obtained through the camera of the electronic device 101. For example, when the electronic device 101 is a smartphone, a tablet, or a laptop computer, the background 405 may be a wallpaper. However, the disclosure is not limited thereto.

For example, the screen 400 may include a plurality of executable objects 410. For example, an executable object 410-1 among the plurality of executable objects 410 may be identified or focused on. For example, the executable object 410-1 may be focused on based on a pointer (or cursor) 415 moved on the executable object 410-1 based on a gaze input or a gesture input. For example, the executable object 410-1 may be focused on based on a cursor located on the executable object 410-1 in response to the display of the screen 400. However, the disclosure is not limited thereto.

For example, the processor 210 may display at least one visual object 420 in response to focusing on (or identification of) the executable object 410-1. For example, the at least one visual object 420 may include a visual object 421 and another visual object 422.

For example, the visual object 421 may indicate that the executable object 410-1 is focused on among the plurality of executable objects 410. For example, the visual object 421 may indicate that the microphone 230 is enabled for receiving an input for the executable object 410-1. For example, the executable object 410-1 associated with the visual object 421 may be visually highlighted relative to at least one other executable object among the plurality of executable objects 410. For example, the visual object 421 may be displayed along a periphery of the executable object 410-1.

For example, the other visual object 422 may indicate that the microphone 230 is enabled. For example, the other visual object 422 may indicate that the microphone 230 is enabled for receiving an input on the executable object 410-1. For example, the other visual object 422 displayed with the visual object 421 may indicate that the microphone 230 is enabled for receiving the input on the executable object 410-1. For example, the other visual object 422 may indicate that the microphone 230 is enabled for receiving the input on the executable object 410-1, by having a color corresponding to a color (or representative color) of the executable object 410-1. However, the disclosure is not limited thereto.

For example, the at least one visual object 420 may be at least partially replaced. For example, the visual object 421 may be replaced with a layer 450 at least partially over-lapped on the executable object 410-1. For example, the layer 450 may be translucent so that executable object 410-1 may be viewed. For example, the visual object 421 may be replaced with a visual effect 460 representing the periphery of the sparkling executable object 410-1. For example, the sparkle provided through the visual effect 460 may be moved along the periphery at a predetermined speed. For example, the least one visual object 420 including the visual object 422 or the visual object 421 and the visual object 422 may be replaced with a visual object 470 that is floated or overlapped on the executable object 410-1. For example, the visual object 470 may spark for highlight. However, the disclosure is not limited thereto.

Referring back to FIG. 3, in operation 305, the processor 210 may identify whether a voice signal obtained through the microphone 230 while the at least one visual object is displayed corresponds to a voice command allocated to the executable object. For example, the processor 210 may obtain the voice signal through the microphone 230 while the at least one visual object is displayed. For example, in response to obtaining the voice signal, the processor 210 may recognize the voice signal for a comparison with the voice command. For example, the processor 210 may recognize the voice signal by identifying whether at least one keyword of the voice command is included in the voice signal. However, the disclosure is not limited thereto.

For example, the processor 210 may convert the voice signal into text, and identify whether the converted text corresponds to the voice command allocated to the execut-able object. For example, the voice command may be predetermined or predefined within the electronic device 101 before the voice signal is obtained. For example, the electronic device 101 may store information for each of the plurality of executable objects. For example, the processor 210 may identify information for the executable object from the stored information, in response to identifying that the voice signal is obtained through the microphone 230. For example, the processor 210 may obtain the voice command from the identified information. For example, the processor 210 may identify whether the voice signal corresponds to the voice command by comparing the voice signal with the obtained voice command.

The information may be set in a compatible, expandable, or flexible format. For example, the information may be set in a javascript object notification (JSON) format. For example, the information set in the JSON format may be set so that a software application developer may add, modify, or adjust a voice command allocated to the executable object or a function associated with the voice command, as well as a system provider. For example, when the information set in the JSON format is for an executable object for inputting the date and time, the information set in the JSON format may be illustrated in Table 1 below.

TABLE 1

```
JSON
{
    "component type": "date/time picker"
    "system defined": [
    {
        "date": "YYYY-MM-DD"
        "time": "hh:mm:ss"
        "action": "system.intent.select.date"
    }
    "developer defined":
    {
    ... // developer can define additional commands
    }
}
```

The portion of Table 1 under the heading "developer defined" may be a portion for software application developers.

For example, when the information set in the JSON format is for an executable object for an outgoing call through a contact list, the information set in the JSON format may be illustrated in Table 2 below.

TABLE 2

```
JSON
{
    "component type": "contact list"
    "contact"; [
    {
        "contact 1": "adb"
        "contact 2": "AGINES"
        "contact 3": "ALARN"
        "contat 4"; "Aleen"
        ...
    }
    {
        "action": "system.intent.action.Call"
        "action1": "system.intent.action.Call('adb')"
        "action2": "system.intent.action.Call('AGINES')"
        "action3": "system.intent.action.Call('ALARN')"
        "action4"; "system.intent.action.Call('Aleen')"
    }
    ]
}
```

For example, a processor (e.g., the processor 210 of FIG. 2) may execute an outgoing call to another electronic device (e.g., an electronic device of "Aleen") through the information represented in Table 2, in response to a user input indicating that an executable object corresponding to "Aleen" in the contact list is selected.

Figure 9:
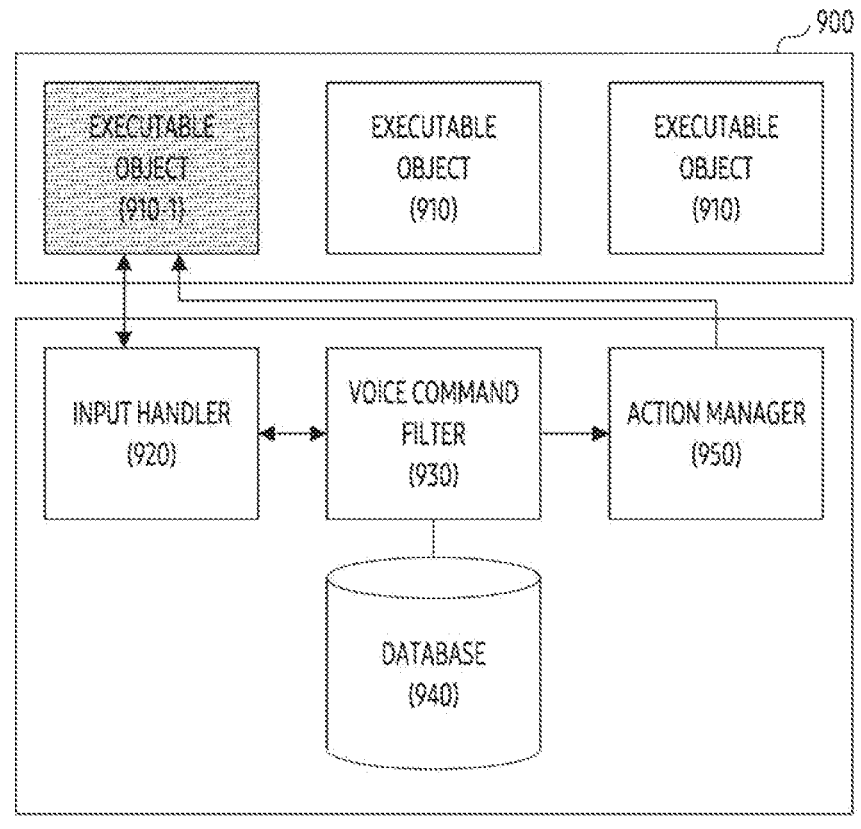
FIGS. 9 and 10 illustrate examples of functional components executed by a processor of an exemplary electronic device.
Figure 10:
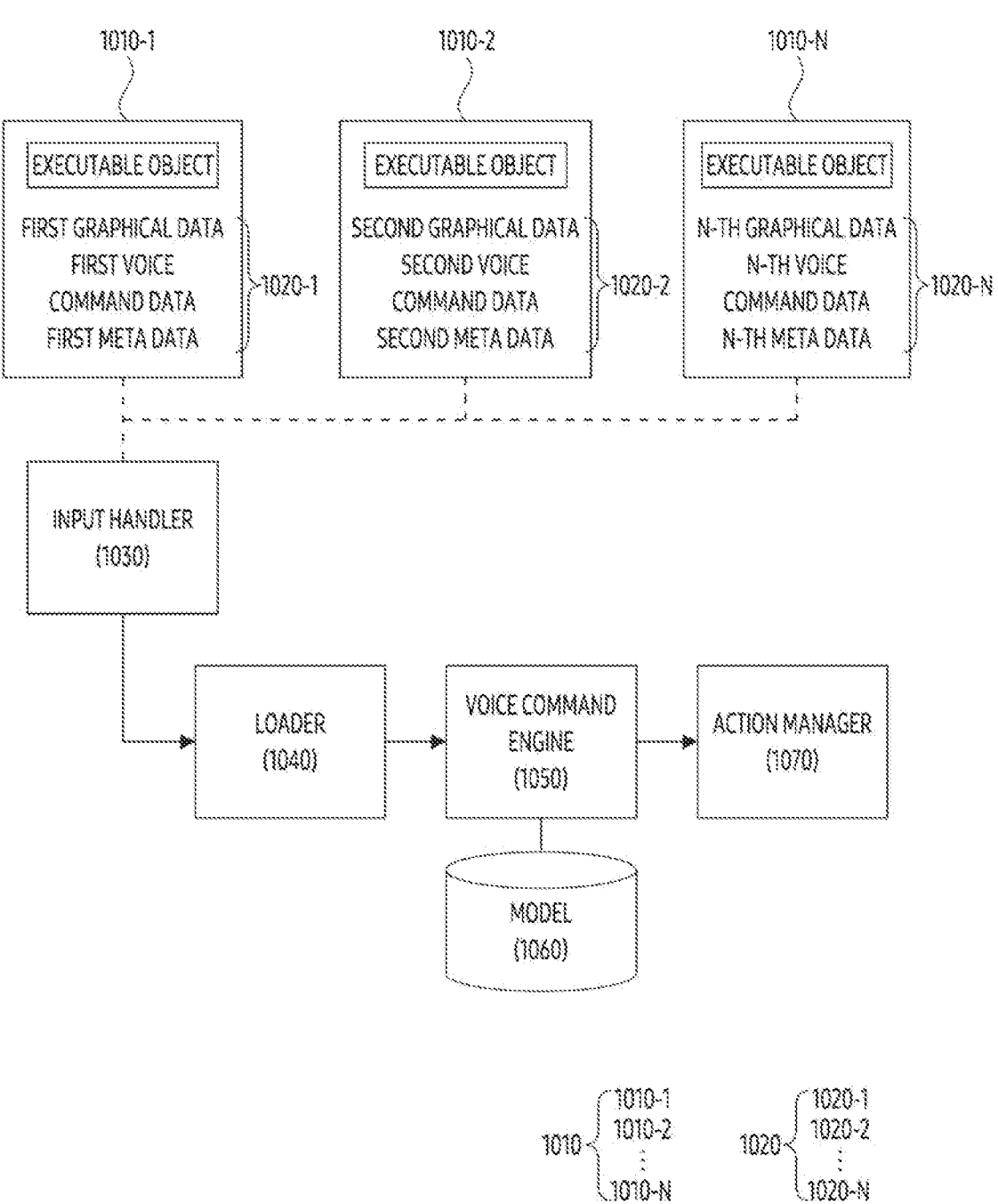

The information will be additionally illustrated through the description of FIGS. 9 and 10.

For example, since the processor 210 compares the voice command obtained from the identified information with the voice signal, instead of comparing each of all voice commands available in the electronic device 101 with the voice signal obtained while the at least one visual object is displayed, a probability that the voice signal is recognized differently from the user's intention may become relatively lower. For example, the electronic device 101 may enhance quality of the voice recognition service. For example, since the amount of resources consumed for comparing the voice command obtained from the identified information and the voice signal is less than the amount of resources consumed for comparing the voice signal with each of all the voice commands available in the electronic device 101, the electronic device 101 may enhance resource efficiency for the voice recognition service.

For example, the processor 210 may execute operation 307 on a condition that the voice signal corresponds to the voice command (operation 305—YES), and execute operation 309 on a condition that the voice signal is distinct from the voice command (operation 305—NO).

In operation 307, the processor 210 may execute a function of the executable object associated with the voice command based on the voice signal corresponding to the voice command. For example, the information for the executable object may include data on the function associated with the voice command. For example, the processor 210 may execute the function based on the data. The data will be illustrated in more detail through the description of FIGS. 9 and 10.

For example, the function of the executable object associated with the voice command may be implemented in various ways. The function of the voice command and the executable object associated with the voice command may be illustrated through FIGS. 5A to 5D.

FIGS. 5A to 5D illustrate an example of a voice command allocated to an executable object.

Figure 5A:
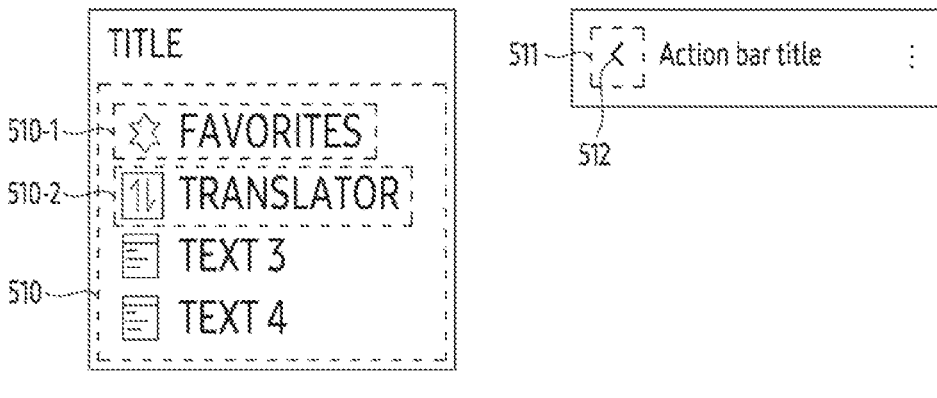
FIGS. 5A to 5D illustrate an example of a voice command allocated to an executable object.
Figure 5A:
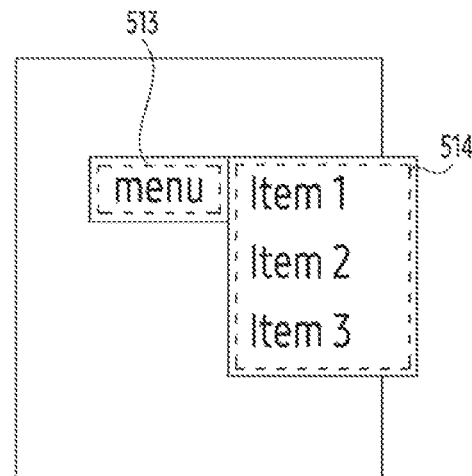

Referring to FIG. 5A, the executable object focused on may be one of the executable objects 510. For example, a voice command allocated to each of the executable objects 510 may be defined as text (or words) included in each of the executable objects 510. For example, the voice command allocated to an executable object 510-1 may be "Favorites" that is text included in the executable object 510-1. For example, the function associated with the voice command may be to display a list of web pages included in favorites. For example, a processor (e.g., the processor 210 of FIG. 2) may display the list, in response to the voice signal corresponding to "Favorites". However, the disclosure is not limited thereto.

For example, the voice command allocated to an executable object 510-2 may be "Translator" that is text included in the executable object 510-2. For example, the function associated with the voice command may be to display a web page in which a first language within the web page is translated into a second language. For example, the processor 210 may execute the translation in response to the voice signal corresponding to the "translator" and display the web page translated into the second language. However, the disclosure is not limited thereto.

For example, the executable object focused on may be an executable object 511. For example, a voice command allocated to the executable object 511 may indicate a visual element 512 included in the executable object 511. For example, the voice command allocated to the executable object 511 may be "Back" that represents the shape of the visual element 512 included in the executable object 511. For example, the function associated with the voice command may be to display a previous screen. For example, the processor 210 may display the previous screen in response to the voice signal corresponding to "Back". However, the disclosure is not limited thereto.

For example, the executable object focused on may be an executable object 513. For example, a voice command allocated to the executable object 513 may indicate a type of an input received for the executable object 513 or a function provided through the executable object 513. For example, the voice command allocated to the executable object 513 may be "Long press" representing a type of the input and/or "Display a list of items" representing the function. For example, the function associated with the voice command may be to display a list 514 of the items. For example, the processor 210 may display the list 514 in response to the voice signal corresponding to "Long press" or "Display a list of items". However, the disclosure is not limited thereto.

Figure 5B:
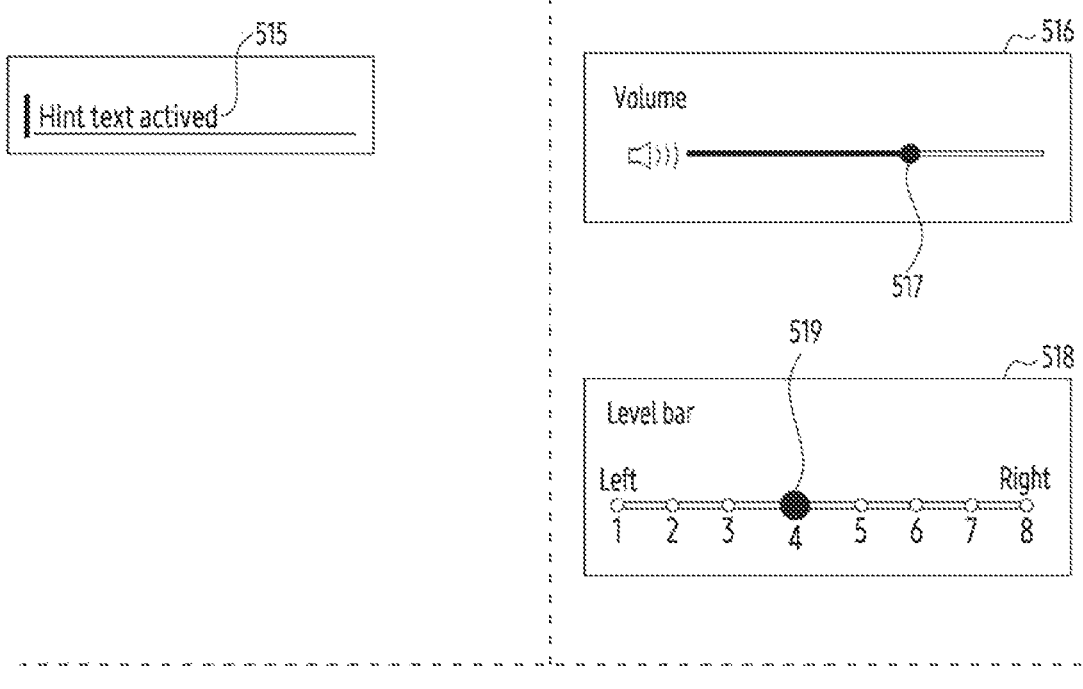

Referring to FIG. 5B, the executable object focused on may be an executable object 515 that is a text input portion or a text input field. For example, a voice command allocated to the executable object 515 may indicate activation or deactivation of another function used to provide a function of the executable object 515. For example, the voice command allocated to the executable object 515 may be "Dictate", "Stop dictation", "Keyboard", "Display a keyboard", and/or "Stop displaying a keyboard". For example, the function associated with the voice command may be obtaining another voice signal corresponding to text to be inputted in the text input portion through a microphone (e.g., the microphone 230 of FIG. 2), displaying a virtual keyboard, stopping the input of text to the text input portion, or stopping to display the virtual keyboard. For example, the processor 210 may display the virtual keyboard in response to the voice signal corresponding to the "Keyboard". However, the disclosure is not limited thereto.

For example, the executable object focused on may be an executable object 516. For example, a voice command allocated to the executable object 516 may indicate a movement of the executable object 516 or a visual element 517 within the executable object 516, a direction of the movement, or a function provided according to the movement. For example, the voice command allocated to the executable object 516 may be "Left", "Right", "Low", "High", "Large" and/or "Small". For example, the function associated with the voice command may be to change the volume of the audio provided through the electronic device 101. For example, the processor 210 may move the visual element 517 in the executable object 516 to the left and reduce the volume, in response to the voice signal corresponding to "Small".

For example, the executable object focused on may be an executable object 518. For example, a voice command allocated to the executable object 518 may indicate a position where the executable object 518 or a visual element 519 within the executable object 518 is to be moved. For example, the voice command allocated to the executable object 518 may be "Level 1", "Level 2", "Level 3", "Level 4", "Level 5", "Level 6", "Level 7", and "Level 8". For example, the function associated with the voice command may be to provide information at a level corresponding to the position. For example, the processor 210 may move the visual element 519 in the executable object 518 to a position corresponding to "Level 3" and provide information at level 3, in response to the voice signal corresponding to "Level 3".

For example, the executable object focused on may be an executable object 520. For example, a voice command allocated to the executable object 520 may indicate one item of a plurality of items selectable through the executable object 520. For example, the voice command allocated to the executable object 520 may be "1", "2", . . . , and "31" (or "30"). For example, the function associated with the voice command may be to provide the item. For example, the processor 210 may display item "24" within the executable object 520, in response to the voice signal corresponding to "24". For example, the voice signal may include content for at least one other executable object 521 associated with the executable object 520. For example, on a condition that the executable object 520 focused on among the plurality of executable objects is associated with at least one other executable object 521, the processor 210 may recognize the voice signal for a comparison with the voice command allocated to at least one other executable object 521. For example, in response to the voice signal corresponding to "Dec. 24, 2020", the processor 210 may identify at least one other executable object 521 associated with the executable object 520, and display the executable object 520 providing the item "24" and at least one other executable object 521 providing the item "December 2020".

For example, the voice command allocated to each of the executable object 515, the executable object 516, the executable object 518, and the executable object 520 may correspond to a template identifier (ID) (e.g., TEXTBOX, VOL-CONTROL, LEVELBAR, DATESETTING). For example, the voice command may be allocated or set based on the template ID. For example, the processor 210 may provide a function corresponding to the voice command, by recognizing the voice signal with respect to the template ID. As a non-limiting example, when a voice signal obtained while the executable object 516 is focused on is "Low", the processor 210 may identify that "Low" recognized from the voice signal is the voice command.

Figure 5C:
Figure 5C:
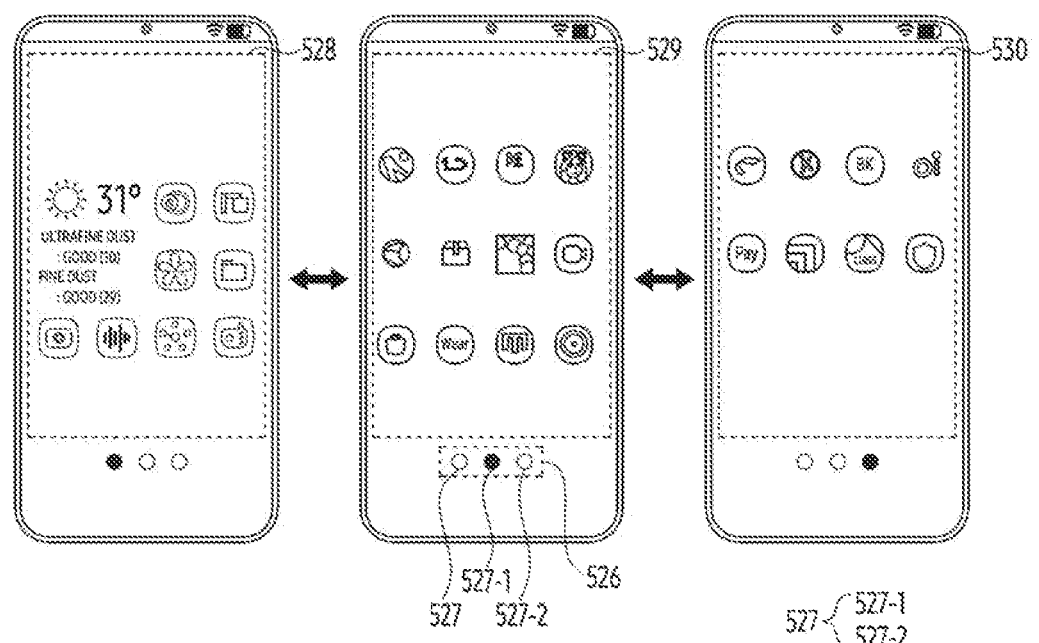

Referring to FIG. 5C, the executable object focused on may be an executable object 522. For example, a voice command allocated to the executable object 522 may indicate a type of an input received for the movement of the executable object 522 or a function provided according to the movement of the executable object 522. For example, the voice command allocated to the executable object 522 may be "Scroll", "Scroll input", "Scroll up", and/or "Scroll down" indicating the type of the input or the function. For example, the function associated with the voice command may be to scroll through content related to the executable object 522. For example, in response to the voice signal corresponding to "Scroll", "Scroll input", "Scroll up", or "Scroll down", the processor 210 may display another part of the content changed from a part of the content by scrolling the content.

For example, the executable object focused on may be an executable object 523. For example, a voice command allocated to the executable object 523 may indicate changing a focus from the executable object 523 to another executable object (e.g., an executable object 524 and an executable object 525) adjacent to the executable object 523. For example, the voice command allocated to the executable object 523 may be "Cursor movement", "Cursor up", and/or "Cursor down". For example, the function associated with the voice command may be changing the focus from the executable object 523 to another executable object (e.g., the executable object 524 and the executable object 525). For example, in response to the voice signal corresponding to "Cursor movement", "Cursor up", and/or "Cursor down", the processor 210 may change the focus to the other executable object (e.g., the executable object 524 or the executable object 525).

For example, the executable object focused on may be an executable object 526. For example, a voice command allocated to the executable object 526 may indicate selecting a visual element of visual elements 527 within the executable object 526 or selecting content corresponding to each of the visual elements 527. For example, the voice command allocated to the executable object 526 may be "Page 1", "Page 2", "Page 3", "Previous page", and/or "Next page".

For example, the function associated with the voice command may be to display content changed according to the selection. For example, the processor 210 may display content 530 changed from content 529, in response to the voice signal corresponding to "Next page" or "Page 3".

Figure 5D:
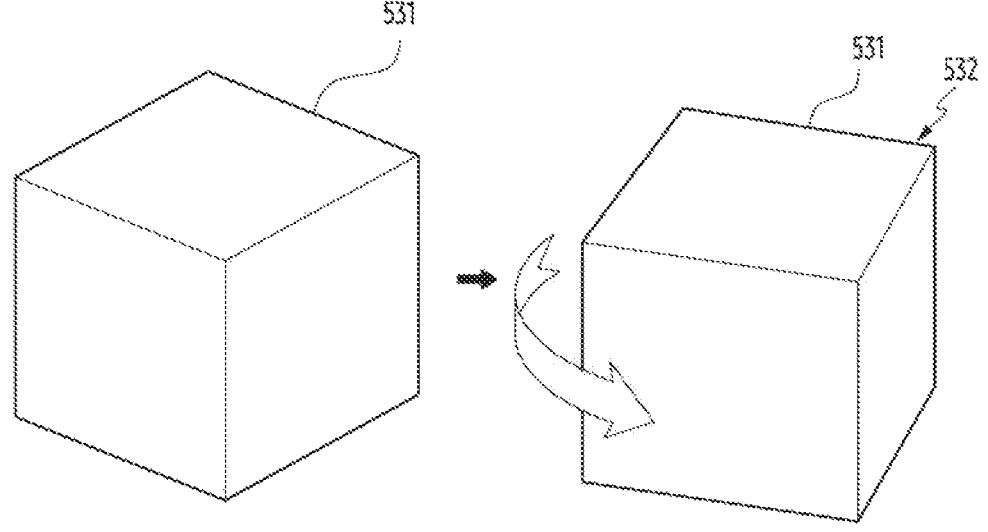

For example, referring to FIG. 5D, the executable object focused on may be an executable object 531. For example, a voice command allocated to the executable object 531 may indicate a change in representation, size, state, or posture of the executable object 531. For example, the voice command allocated to the executable object 531 may be "X degree counterclockwise rotation" (X is a real number between 0 and 360), "Small," or "Large". For example, the function associated with the voice command may be to change the representation, size, state, or posture of the executable object 531. For example, the processor 210 may change a posture of the executable object 531 as shown in a state 532, in response to the voice signal corresponding to "X degree counterclockwise rotation".

Referring back to FIG. 3, in operation 309, the processor 210 may terminate recognizing the voice signal based on the voice signal being distinct from the voice command. For example, the processor 210 may stop processing the voice signal, based on identifying that the voice signal is different from the voice command based on a comparison between the voice signal and the voice command executed according to operation 305. For example, the processor 210 may refrain from or bypass executing a comparison between the voice signal and each of remaining voice commands among all voice commands available within the electronic device 101, based on the identification. For example, the processor 210 may identify whether another voice signal that is next to the voice signal is obtained through the microphone 230, while the at least one visual object is displayed after terminating the recognition of the voice signal.

As described above, the electronic device 101 may receive an input of the executable object as a voice input when the executable object is focused on among the plurality of executable objects within the screen. For example, the electronic device 101 may enhance convenience of an input to the executable object through the reception of the voice input. For example, the electronic device 101 may display the at least one visual object indicating that an input to the executable object may be received through the microphone 230. For example, since the at least one visual object guides that the executable object is controllable through the voice input, the electronic device 101 may provide an enhanced user experience through the display of the at least one visual object. For example, since the voice input received through the microphone 230 while the at least one visual object is displayed is identified to a voice command allocated to the executable object, the electronic device 101 may enhance the accuracy of feedback through the voice input. For example, since the voice input received through the microphone 230 while the at least one visual object is displayed is identified to a voice command allocated to the executable object, the electronic device 101 may provide feedback on the voice input through a reduced amount of computations.

Figure 6:
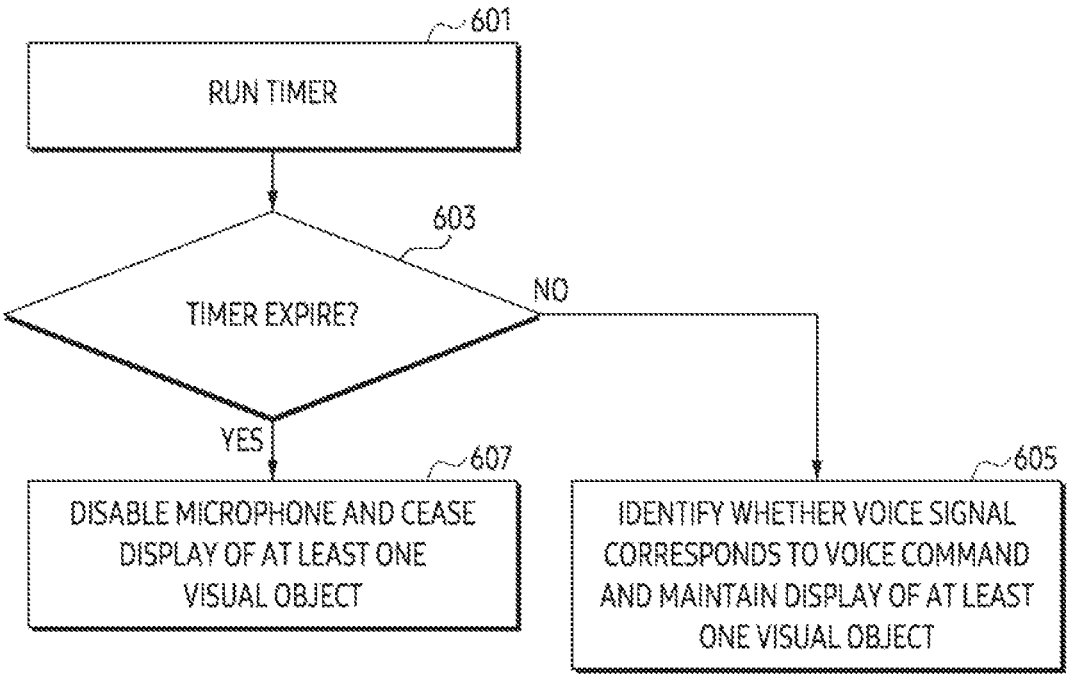
FIG. 6 is a flowchart illustrating an exemplary method of displaying at least one visual object by using a timer.

FIG. 6 is a flowchart illustrating an exemplary method of displaying at least one visual object by using a timer. The method may be executed by the processor 210 illustrated in FIG. 2. In the following embodiment, each operation may be performed sequentially, but is not necessarily performed sequentially. For example, the order of each operation may be changed, or at least two operations may be performed in parallel.

Operations 601 to 607 of FIG. 6 may be included in operations illustrated through the descriptions of FIGS. 3 to 5, or related to the operations illustrated through the descriptions of FIGS. 3 to 5.

Referring to FIG. 6, in operation 601, in response to displaying the at least one visual object, the processor 210 may enable a microphone (e.g., the microphone 230 of FIG. 2) for the executable object and run a timer. For example, the timer may be operated to identify a time when the microphone 230 is enabled and a time when the at least one visual object is displayed. For example, since the fact that a voice signal is not received through the microphone 230 during a certain time elapsed from the display of the at least one visual object may indicate a user's intention not to execute the function of the executable object, the processor 210 may operate the timer in response to the display of the at least one visual object.

In operation 603, the processor 210 may identify whether the timer expires. For example, the processor 210 may execute operation 605 while the timer is operated (operation 603—NO), and execute operation 607 in response to an expiration (operation 603—YES) of the timer.

In operation 605, while the timer is operated, the processor 210 may identify whether the voice signal obtained through the microphone 230 corresponds to the voice command and maintain the display of the at least one visual object. For example, the identification may correspond to at least a part of operation 305 of FIG. 3. For example, maintaining the display of the at least one visual object may indicate that the at least one visual object is displayed while the timer is operated. For example, while the timer is operated, a representation of the at least one visual object may be changed. For example, while the timer is operated, a color of the at least one visual object may be changed from a first color to a second color. For example, while the timer is operated, a shape of the at least one visual object may be changed from a first shape to a second shape. For example, while the timer is operated, a size of the at least one visual object may be changed from a first size to a second size. However, the disclosure is not limited thereto.

For example, the timer may be stopped at least temporarily while the voice signal is obtained. For example, the timer may be restarted in response to completing to obtain the voice signal. For example, the timer may be restarted in response to identifying that the voice signal is distinct from the voice command. For example, a stop of the timer may be maintained based on identifying that the voice signal corresponds to the voice command.

In operation 607, in response to the expiration of the timer, the processor 210 may disable the microphone 230 and cease the display of the at least one visual object. For example, since the voice signal corresponding to the voice command is not obtained until the timer expires indicates that the activation of the microphone 230 and the display of the at least one visual object differ from the user's intention, the processor 210 may execute operation 607.

As described above, the electronic device 101 may reduce the power consumed for the activation of the microphone 230 through the timer. For example, since the electronic device 101 ceases the display of the at least one visual object according to the expiration of the timer, the electronic device 101 may enhance the visual quality of the at least one other executable object reduced for the executable object, by using the timer.

Figure 7:
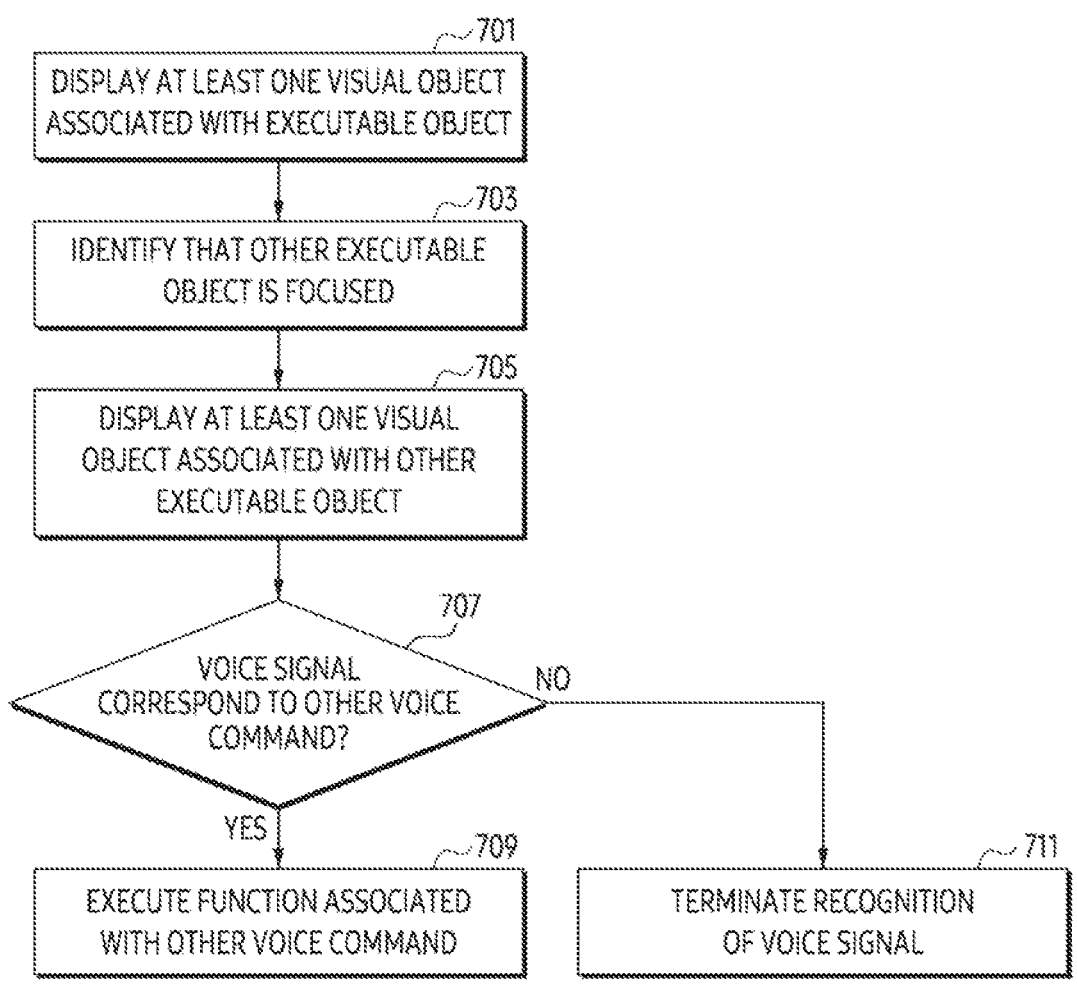
FIG. 7 is a flowchart illustrating an exemplary method of executing a function associated with another voice command allocated to another executable object based on a voice signal.

FIG. 7 is a flowchart illustrating an exemplary method of executing a function associated with another voice command allocated to another executable object based on a voice signal. The method may be executed by the processor 210 illustrated in FIG. 2. In the following embodiment, each operation may be performed sequentially, but is not necessarily performed sequentially. For example, the order of each operation may be changed, or at least two operations may be performed in parallel.

Operations 701 to 711 of FIG. 7 may be related to operations illustrated with the description of FIGS. 3 to 5.

Referring to FIG. 7, in operation 701, the processor 210 may display the at least one visual object associated with the executable object. For example, operation 701 may correspond to operation 303 of FIG. 3.

In operation 703, the processor 210 may identify that another executable object among the plurality of executable objects in the screen is focused on. For example, the change of focus from the executable object to the other executable object may be executed in response to a gaze input or a gesture input. For example, such as the change of focus from the executable object 523 to the executable object 524 (or the executable object 525) of FIG. 5C, the change may be performed in response to the voice signal obtained through a microphone (e.g., the microphone 230 of FIG. 2) while the at least one visual object associated with the executable object is displayed. However, the disclosure is not limited thereto.

In operation 705, the processor 210 may display the at least one visual object associated with the other executable object in response to the identification. For example, in response to the identification, the processor 210 may display the at least one visual object associated with the other executable object, by changing a position of the at least one visual object or moving the at least one visual object.

For example, the processor 210 may enable the microphone 230 for the other executable object in response to the identification, and display the at least one visual object indicating that the microphone 230 is enabled for receiving an input to the other executable object among the plurality of executable objects. A display of the at least one visual object associated with the other executable object may be illustrated through FIG. 8.

Figure 8:
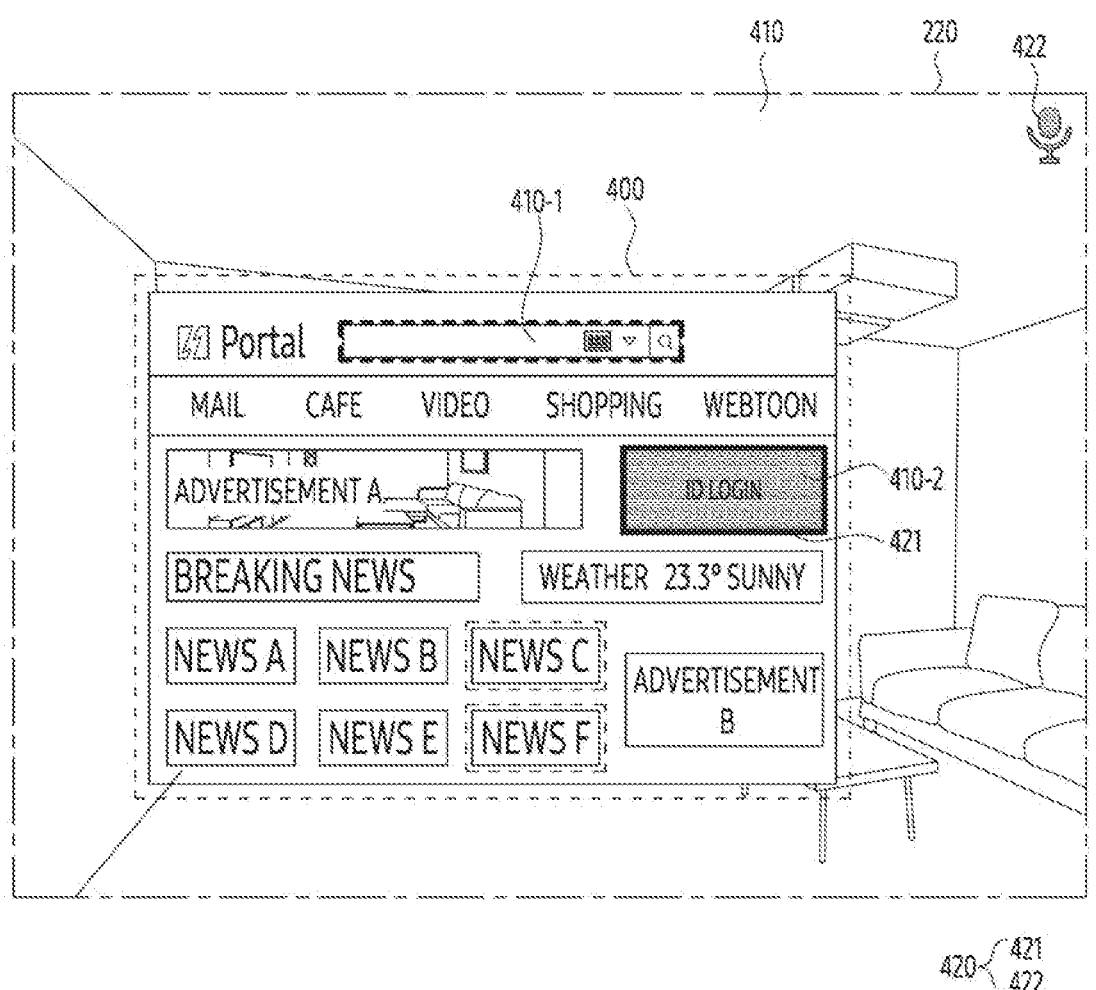
FIG. 8 illustrates an example of at least one visual object indicating that a microphone is enabled for receiving an input on another executable object.

FIG. 8 illustrates an example of at least one visual object indicating that a microphone is enabled for receiving an input on another executable object.

Referring to FIG. 8, a processor (e.g., the processor 210 of FIG. 2) may move the visual object 421 in response to focusing on the other executable object. For example, the processor 210 may cause a visual highlight to be displayed along a periphery of another executable object 410-2 according to the movement of the visual object 421. For example, the visual object 421 may indicate that the other executable object 410-2 is focused on among the plurality of executable objects 410. For example, the visual object 421 may indicate that a microphone (e.g., the microphone 230 of FIG. 2) is enabled for receiving an input to the other executable object 410-2. For example, the other executable object 410-2 associated with the visual object 421 may be visually highlighted.

For example, a color of the at least one visual object 420 may be changed in response to focusing on the other executable object 410-2. For example, a color of the other visual object 422 may be changed from a color (or representative color) of the executable object 410-1 to a color (or representative color) of the other executable object 410-2 to indicate that the microphone 230 is enabled for the other executable object 410-2. For example, a position of the other visual object 422 may be maintained, unlike the visual object 421 that is moved according to the change of focus to the other executable object 410-2. However, the disclosure is not limited thereto.

Referring back to FIG. 7, in operation 707, the processor 210 may identify whether a voice signal obtained through the microphone 230 while the at least one visual object associated with the other executable object is displayed corresponds to another voice command allocated to the other executable object. For example, the other voice command may be distinguished from the voice command allocated to the executable object. For example, the processor 210 may execute operation 709 on a condition (operation 707—YES) that the voice signal obtained in operation 707 corresponds to the other voice command, and execute operation 711 on a condition (operation 707—NO) that the voice signal obtained in operation 707 is distinguished from the other voice command.

In operation 709, the processor 210 may execute a function of the other executable object associated with the other voice command, based on the voice signal corresponding to the other voice command.

In operation 711, the processor 210 may terminate recognizing the voice signal, based on the voice signal distinct from the other voice command.

As described above, the electronic device 101 may visually highlight an object (e.g., the other executable object) that an input received through the microphone 230 will be applied, by moving the at least one visual object according to a movement of focus.

FIGS. 9 and 10 illustrate examples of functional components executed by a processor of an exemplary electronic device. The functional components may be executed by the processor 210 illustrated in FIG. 2.

Referring to FIG. 9, the processor 210 may identify that an executable object 910-1 among executable objects 910 in a screen 900 is focused on. For example, in response to the identification, the processor 210 may enable a microphone (e.g., the microphone 230 of FIG. 2) and run the timer illustrated through the description of FIG. 6, by using an input handler 920. For example, the processor 210 may obtain a voice signal through the microphone 230 while the timer is operated. For example, the processor 210 may provide the voice signal to a voice command filter 930 by using the input handler 920. For example, the processor 210 may obtain information for the executable object 910-1 from information for the executable object 910 stored in database 940, by using the voice command filter 930. For example, the processor 210 may identify a voice command mapped to the executable object 910-1, based on the information for the executable object 910-1, by using the voice command filter 930. For example, the processor 210 may compare the voice signal with the voice command, by using the voice command filter 930.

For example, the processor 210 may provide an action manager 950 with data indicating that the voice signal corresponds to the voice command, based on the voice signal corresponding to the voice command, by using the voice command filter 930. For example, the processor 210 may perform a function of the executable object 910-1 linked to the voice command, in response to the data, by using the action manager 950.

For example, the processor 210 may terminate recognizing the voice signal, based on the voice signal distinct from the voice command, by using the voice command filter 930.

Referring to FIG. 10, the electronic device 101 may store information for each of executable objects 1010 included in the screen. For example, the information may include a set of data. The set may include graphical data indicating a shape of each of the executable objects 1010, voice command data indicating a voice command allocated to each of the executable objects 1010, and metadata indicating a function of each of the executable objects 1010 associated with the voice command. For example, information for an executable object 1010-1 among the executable objects 1010 may include a set 1020-1 of data. For example, the set 1020-1 may include first graphical data, first voice command data, and first metadata. For example, information for an executable object 1010-2 among the executable objects 1010 may include a set 1020-2 of data. For example, the set 1020-2 may include second graphical data, second voice command data, and second metadata. For example, information for an executable object 1010-N among the executable objects 1010 may include a set 1020-N of data. For example, the set 1020-N may include Nth graphical data, Nth voice command data, and Nth metadata.

For example, a processor (e.g., the processor 210 of FIG. 2) may enable a microphone (e.g., the microphone 230 of FIG. 2) and run the timer illustrated through the description in FIG. 6, in response to focusing on the executable object 1010-1 among the executable objects 1010, by using an input handler 1030. For example, the processor 210 may obtain the first voice command data and the first metadata from the set 1020-1, in response to the focus, by using the input handler 1030. For example, the first voice command data and the first metadata may be provided to a loader 1040.

For example, the processor 210 may obtain a voice signal through the microphone 230 while the timer is operated. For example, the processor 210 may provide the voice signal to the loader 1040, in response to the obtainment, by using the input handler 1030. For example, the processor 210 may provide the voice signal and the first voice command data to a voice recognition engine 1050 by using the loader 1040. The processor 210 may provide the first metadata to an action manager 1070 by using the input handler 1030. However, the disclosure is not limited thereto.

For example, the processor 210 may recognize the voice signal to be the first voice command data, by using the voice recognition engine 1050. For example, the processor 210 may identify whether the voice signal corresponds to the first voice command data by using the voice recognition engine 1050, based on information obtained from a model 1060 (e.g., a model trained through machine learning (ML)) connected with the voice recognition engine 1050. For example, the processor 210 may convert the voice signal into text by using the model 1060 for automatic speech recognition (ASR) and compare the text with the first voice command data. For example, the comparison may be performed through an exact matching algorithm and/or a Levenshtein distance algorithm. However, the disclosure is not limited thereto.

For example, the processor 210 may provide the action manager 1070 with data indicating that a function is executed based on the first metadata, by using the voice recognition engine 1050, based on the voice signal corresponding to the first voice command data. For example, the processor 210 may execute a function of the executable object 1010-1 linked to the first voice command data, based on the data, by using the action manager 1070.

For example, based on the voice signal being different from the first voice command data, the processor 210 may provide the action manager 1070 with data indicating to refrain from executing a function based on the first metadata by using the voice recognition engine 1050 or the input handler 1030, or may stop recognizing the voice signal.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN))).

These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

As described above, an electronic device 101 may comprise a microphone 230, a display 220, and a processor 210. According to an embodiment, the processor 210 may be configured to display, via the display 220, a screen including a plurality of executable objects. According to an embodiment, the processor 210 may be configured to enable the microphone 230 for the executable object based on an executable object focused on among the plurality of executable objects, and display, via the display 220, at least one visual object 420 indicating that the microphone 230 is enabled for receiving an input on the executable object among the plurality of executable objects. According to an embodiment, the processor 210 may be configured to identify whether a voice signal obtained via the microphone 230 while the at least one visual object 420 is displayed corresponds to a voice command allocated to the executable object. According to an embodiment, the processor 210 may be configured to execute a function of the executable object associated with the voice command, based on the voice signal corresponding to the voice command.

According to an embodiment, the at least one visual object 420 may include a visual object 421 displayed as associated with the executable object. According to an embodiment, the executable object associated with the visual object 421 may be visually highlighted with respect to at least another executable object among the plurality of executable objects.

According to an embodiment, the at least one visual object 420 may include another visual object 422 distinct from the visual object 421. According to an embodiment, the other visual object 422 may indicate that the microphone 230 is enabled.

According to an embodiment, the visual object 421 may be displayed along a periphery of the executable object. According to an embodiment, the other visual object 422 may be spaced apart from the visual object 421.

According to an embodiment, the processor 210 may be configured to obtain, in response to the voice signal obtained while the at least one visual object 420 is displayed, the voice command from information for the executable object. According to an embodiment, the processor 210 may be configured to identify, by comparing the voice signal with the voice command, whether the voice signal corresponds to the voice command.

According to an embodiment, the information may include data regarding the function associated with the voice command.

According to an embodiment, the processor 210 may be configured to enable the microphone 230 for the executable object and run a timer, in response to displaying the at least one visual object 420. According to an embodiment, the processor 210 may be configured to identify whether the voice signal obtained via the microphone 230 corresponds to the voice command and maintain the display of the at least one visual object 420, while the timer is operated. According to an embodiment, the processor 210 may be configured to disable the microphone 230 and cease the display of the at least one visual object 420, in response to an expiration of the timer.

According to an embodiment, the timer may be at least temporarily stopped while the voice signal is obtained. According to an embodiment, the timer may be restarted in response to completing to obtain the voice signal.

According to an embodiment, the processor 210 may be further configured to terminate recognizing the voice signal, based on the voice signal distinct from the voice command.

According to an embodiment, the processor 210 may be configured to identify that another executable object is focused on among the plurality of executable objects. According to an embodiment, the processor 210 may be configured to enable the microphone 230 for the other executable object in response to the identification and display, via the display 220, the at least one visual object 420 indicating that the microphone 230 is enabled for receiving an input on the other visual object 422 among the plurality of executable objects. According to an embodiment, the processor 210 may be configured to identify whether a voice signal obtained via the microphone 230 while the at least one visual object 420 indicating that the microphone 230 is enabled for receiving the input on the other visual object 422 corresponds to another voice command allocated to the other executable object, the other voice command distinct from the voice command. According to an embodiment, the processor 210 may be configured to execute a function of the other executable object associated with the other voice command, based on the voice signal corresponding to the other voice command.

According to an embodiment, the voice signal may be recognized for a comparison with the voice command.

According to an embodiment, the electronic device 101 may be an augmented reality (AR) glass. According to an embodiment, the screen may be displayed with an external object viewed via the display 220.

According to an embodiment, the electronic device 101 may be a video see-through (VST) device. According to an embodiment, the screen may be displayed with an image regarding an environment around the electronic device 101, the image obtained via a camera of the electronic device 101.

According to an embodiment, the executable object may be focused on based on a pointer on the executable object.

According to an embodiment, the executable object may be focused on in response to the display of the screen.

As described above, an electronic device comprises a microphone, a display, at least one memory storing at least one instruction, and at least one processor. According to an embodiment, the at least one processor may be configured to execute the at least one instruction to: display, via the display, a screen comprising a plurality of executable objects, based on an executable object being selected among the plurality of executable objects, enable the microphone and display, via the display, at least one visual object indicating that the microphone is enabled to receive an input corresponding to the selected executable object, wherein the at least one visual object is configured to visually highlight the selected with respect to other executable objects among the plurality of executable objects, based on displaying the at least one visual object and enabling the microphone, run a timer, while the timer runs, identify whether a voice signal obtained via the microphone while the at least one visual object is displayed corresponds to a voice command and maintain the display of the at least one visual object, based on an expiration of the timer and identifying that the obtained voice signal is distinct from the voice command, disable the microphone and cease the display of the at least one visual object, and based on identifying that the obtained voice signal corresponds to the voice command, execute a function of the executable object associated with the voice command.

As described above, a non-transitory computer readable medium has instructions stored therein. According to an embodiment, the instructions, which when executed by at least one processor, cause the at least one processor to execute a method of controlling an electronic device. According to an embodiment, the method comprises displaying, via a display of the electronic device, a screen comprising a plurality of executable objects; based on an executable object being focused on among the plurality of executable objects, enabling the microphone and displaying, via the display, at least one visual object indicating that the microphone is enabled to receive an input corresponding to the executable object; identifying whether a voice signal obtained via the microphone while the at least one visual object is displayed corresponds to a voice command allocated to the executable object; and based on the voice signal corresponding to the voice command, executing a function of the executable object associated with the voice command.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of, the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a microphone;
a display;
memory storing at least one instruction; and
at least one processor configured to execute the at least one instruction,
wherein the at least one instruction, when executed by the at least one processor, causes the electronic device to:
  display, via the display, a screen including a plurality of executable objects;
  based on an executable object being focused on among the plurality of executable objects, display, via the display, at least one visual object indicating that the microphone is being used for receiving an input on the executable object being focused on;
  based on a voice signal being obtained via the microphone while the at least one visual object is displayed:
    identify a voice command registered in information for the executable object, and
    compare, with the voice command, the voice signal obtained via the microphone while the at least one visual object is displayed; and
  based on the voice signal being identified via the comparison as corresponding to the voice command, execute a function of the executable object associated with the voice command.

2. The electronic device of claim 1,
wherein the at least one visual object includes a visual object displayed as associated with the executable object, and
wherein the executable object associated with the visual object is visually highlighted with respect to at least another executable object among the plurality of executable objects.

3. The electronic device of claim 2,
wherein the at least one visual object includes another visual object distinct from the visual object, and
wherein the other visual object indicates that the microphone is being used.

4. The electronic device of claim 3, wherein the visual object is displayed along a periphery of the executable object, and wherein the other visual object is spaced apart from the visual object.

5. The electronic device of claim 1, wherein the information for the executable object comprises data regarding the function of the executable object associated with the voice command.

6. The electronic device of claim 1, wherein the at least one instruction, when executed by the at least one processor, further causes the electronic device to:
  in response to displaying the at least one visual object, run a timer;
  while the timer runs, identify whether the voice signal identified as corresponding to the voice command is obtained via the microphone and maintain the display of the at least one visual object; and
  in response to an expiration of the timer, cease the display of the at least one visual object.

7. The electronic device of claim 6, wherein the timer is at least temporarily stopped in accordance with the voice signal being obtained while the at least one visual object is displayed and is restarted in response to completing to obtain the voice signal.

8. The electronic device of claim 1, wherein the at least one instruction, when executed by the at least one processor, further causes the electronic device to terminate recognizing the voice signal, based on the voice signal being identified via the comparison as distinct from the voice command.

9. The electronic device of claim 1, wherein the at least one instruction, when executed by the at least one processor, further causes the electronic device to:
  identify that another executable object is focused on among the plurality of executable objects;
  in response to the identification that the other executable object is focused on, display, via the display, the at least one visual object indicating that the microphone is being used to receive an input on the other executable object;
  based on a voice signal being obtained via the microphone while the at least one visual object is displayed with respect to the other executable object:
    identify another voice command registered in information for the other executable object, wherein the other voice command is distinct from the voice command, and
    compare, with the other voice command, the voice signal obtained via the microphone while the at least one visual object is displayed with respect to the other executable object; and
  based on the voice signal obtained via the microphone while the at least one visual object is displayed with respect to the other executable object being identified as corresponding to the other voice command, execute a function of the other executable object associated with the other voice command.

10. The electronic device of claim 1, wherein the voice signal is recognized for the comparison with the voice command.

11. The electronic device of claim 1, wherein the electronic device is an augmented reality (AR) glass, and
  wherein the screen is displayed with an external object viewed via the display.

12. The electronic device of claim 1, wherein the electronic device is a video see-through (VST) device, and
  wherein the screen is displayed with an image representing a field of view of a camera of the electronic device.

13. The electronic device of claim 12, wherein the executable object is focused on based on a pointer on the executable object.

14. The electronic device of claim 1, wherein the executable object is focused on, in response to the display of the screen.

15. A method executed in an electronic device including a microphone and a display, the method comprising:

displaying, via the display, a screen including a plurality of executable objects;

based on an executable object being focused on among the plurality of executable objects, displaying, via the display, at least one visual object indicating that the microphone is being used for receiving an input on the executable object being focused on;

based on a voice signal being obtained via the microphone while the at least one visual object is displayed:

identifying a voice command registered in information for the executable object, and comparing, with the voice command, the voice signal obtained via the microphone while the at least one visual object is displayed; and based on the voice signal obtained via the microphone while the at least one visual object is displayed being identified via the comparing as corresponding to the voice command, executing a function of the executable object associated with the voice command.

16. The method of claim 15, wherein the at least one visual object includes a visual object displayed as associated with the executable object, and wherein the executable object associated with the visual object is visually highlighted with respect to at least another executable object among the plurality of executable objects.

17. The method of claim 16, wherein the at least one visual object includes another visual object distinct from the visual object, and wherein the other visual object indicates that the microphone is being used.

18. The method of claim 17, wherein the visual object is displayed along a periphery of the executable object, and wherein the other visual object is spaced apart from the visual object.

19. An electronic device comprising:

a microphone;

a display;

memory storing instructions; and at least one processor, wherein the instructions, when executed by the at least one processor, cause the electronic device to:

display, via the display, a screen including a plurality of executable objects;

based on an executable object among the plurality of executable objects being pointed at by a user input, display, via the display, at least one visual object with respect to the executable object;

based on a voice signal being obtained via the microphone while the at least one visual object is displayed with respect to the executable object, identify whether the voice signal corresponds to a voice command supported by the executable object; and based on the voice signal being identified as corresponding to the voice command, execute a function of the executable object associated with the voice command.

* * * * *